UNITED STATES PATENT OFFICE.

ALADAR von LASZLOFFY, OF PEORIA, ILLINOIS.

PROCESS OF RECOVERING BY-PRODUCTS FROM DISTILLERY-SLOP.

1,177,746.  Specification of Letters Patent.  Patented Apr. 4, 1916.

No Drawing. Original application filed January 30, 1911, Serial No. 605,611. Divided and this application filed July 3, 1913. Serial No. 777,263.

*To all whom it may concern:*

Be it known that I, ALADAR VON LASZLOFFY, a citizen of the United States, residing at Peoria, in the county of Peoria and State of Illinois, have invented certain new and useful Improvements in Processes of Recovering By-Products from Distillery-Slop; and I do hereby declare that the following is a full, clear, and exact description of the invention, which will enable others skilled in the art to which it appertains to make and use the same.

This invention relates to a process for recovering by-products from distillery slop. The object of the invention is to provide a practical method of separating lactic acid and succinic acid extracted from distillery slop from one another, the separation being accomplished by making use of the more ready solubility of the salts of one of said acids compared with that of the other when combined with the same base.

The lactates and succinates of the same base differ in the ease of solubility and I have found that the difference is so pronounced that it can be used with great advantage for the separation of the two acids. For instance I make use of the difference in the solubility of the lactates and succinates of alkaline earth and preferably the difference in the solubility of the lime-salts of lactic acid and succinic acid in water.

The use of lime as a basis and of water as a solvent make this process very economical on account of the low cost of lime and the ease and consequent cheapness with which water can be handled as compared with such solvents as must be recovered, because of their value.

The separation of the two acids from any mixture containing them is best accomplished when other substances such as have a tendency to prevent precipitation or crystallization are first eliminated from said mixture and although the elimination of these substances is preferable it is not an absolute necessity in the practice of my invention that those substances should be removed.

The process is especially advantageous in the separation of lactic and succinic acids derived from such mixtures as are obtained by treating distillery slop with solvents and the following example is the preferred mode of procedure: Concentrated or dried distillery-slop is treated with a solvent such as alcohol, for example, and by this treatment a solution is obtained which contains lactic and succinic acids. The alcohol is preferably evaporated from this solution and the remaining extract is subjected to my improved process forming the subject of this application for separating the extract into lactic and succinic acids. First, the extract is treated with lime, in order to transform the acids into their respective lime-salts. The mixture containing the lactate and succinate of lime is then treated with water in a sufficient proportion to keep the lactate in solution, while the insoluble residue contains the succinate of lime. The quantity of water added is of course governed by the amount of water already present in the mixture which may from previous operations contain enough water to keep the lactate in solution. The two parts are separated by settling, filtering or by employing centrifugal force or other similar or suitable means. The residue may be treated again with a small quantity of water thus repeating the process so as to eliminate the lime lactate entirely from the insoluble residue and the resulting weaker solutions can be used for the treatment of new portions of a mixture containing lactates and succinates of lime. After separating the lactates and succinates in this manner the acids are isolated from the salts by decomposing the salts with stronger acids—preferably sulfuric acid.

I have stated that the separation of the salts of the lactic and succinic acids can be practised better if other substances which prevent precipitation or crystallization are first eliminated. By this, I mean that for example if the extract containing lactic and succinic acids is recovered from distillery-slop by using alcohol as a solvent the extract will contain glycerin and this substance may be eliminated by treating the lactate and succinate of lime with an alcoholic solvent such as a mixture of alcohol and ether, for instance, which will dissolve the glycerin leaving the lactate and succinate of lime in a state of greater purity, thus making their separation much easier of accomplishment.

It is obvious that the process can be varied in different ways. I do not confine myself therefore, to the exact process described.

This is a divisional application of my pending one #605,611, filed January 30, 1911.

I claim:—

1. In the process of reducing succinic acid to a separable form in a mixture of substances derived from distillery-slop, the process which consists in combining said mixture of substances with an alkaline earth and treating it with a solvent that has a smaller dissolving power for the salts of succinic acid thus formed, than for the other substances present in the mixture.

2. The process of preparing succinic acid in a separable form from a mixture of substances derived from distillery-slop, consisting in combining the mixture with an alkaline earth and treating the mixture with water to separate the resulting succinate of the alkaline earth from the substances of higher solubility present in the mixture.

3. The process of separating succinic acid from a mixture of substances derived from distillery-slop, consisting in combining the acids contained in said mixture with lime and treating said mixture with water.

4. In the process of recovering by-products from distillery-slop, the process of separating succinic acid from lactic acid in a mixture of the same, consisting in adding a base to said mixture to produce succinates and lactates of the same base, and separating the resulting salts from one another by treating the mixture with water.

5. In the process of recovering by-products from distillery-slop, the process of preparing succinic acid and lactic acid in a separable form from a mixture containing both said acids, consisting in combining an alkaline earth with said mixture and separating the salts of said acids by dissolving that most easily soluble.

6. In the process of recovering by-products from distillery-slop, the process of separating succinic acid and lactic acid from one another in a mixture of the same consisting in combining an alkaline earth with the mixture and separating the resulting succinate from the lactate by treating the mixture with water.

7. In the process of recovering by-products from distillery-slop, the process of separating succinic acid and lactic acid from one another consisting in combining lime with a mixture containing said acids, and separating their salts from one another by dissolving the lactate of lime.

8. In the process of recovering by-products from distillery-slop, the process of separating succinic and lactic acids from one another consisting in combining lime with the mixture containing said acids, and separating the resulting succinate of lime from the lactate by dissolving the latter in water.

In testimony whereof I affix my signature, in presence of two witnesses.

ALADAR von LASZLOFFY.

Witnesses:
W. I. SLEMMONS,
L. M. THURLOW.